United States Patent

Starr

[15] 3,640,672
[45] Feb. 8, 1972

[54] APPARATUS FOR FORMING A CONTAINER WITH AN INTEGRALLY FORMED HOLLOW HINGED HANDLE

[72] Inventor: Anthony J. Starr, 1412 Lovering Avenue, Wilmington, Del. 19806

[22] Filed: Aug. 25, 1969

[21] Appl. No.: 871,511

[52] U.S. Cl. ............................. 425/387, 264/94, 425/326
[51] Int. Cl. ............................. B29c 17/07, B29d 23/03
[58] Field of Search ............... 264/94, 96, 98, 99; 18/5 BZ, 18/5 BN, 5 BD; 215/1.5

[56] References Cited

UNITED STATES PATENTS 2,991,500  7/1961  Hagen ............................. 264/96 X Primary Examiner—Robert F. White
Assistant Examiner—T. J. Carvis
Attorney—Carpenter, Ostis & Lindberg

[57] ABSTRACT

Apparatus for forming a container from a blow-moldable plastic, and characterized by a hollow handle hingedly connected to a container body. The apparatus includes a tube having a pair of openings, one for blowing the container body, and the other for blowing the handle in a simultaneous operation. This is achieved by introducing the mold parison between the mold halves, part of the parison forming the container body and the other part forming the handle.

1 Claims, 4 Drawing Figures

PATENTED FEB 8 1972 3,640,672

INVENTOR
ANTHONY J. STARR
BY Richard W Carpenter
ATTORNEYS

3,640,672

APPARATUS FOR FORMING A CONTAINER WITH AN INTEGRALLY FORMED HOLLOW HINGED HANDLE

BACKGROUND OF THE INVENTION

1. Field of the Invention

This invention relates to an apparatus for forming a blow-moulded plastic container having an integrally formed hollow handle which is hinged to the container body in the blow-moulding process.

2. The Prior Art

Blow-moulded containers having integrally formed handles are well known in the art. Heretofore, however, such integrally formed handles have been rigidly joined to the container and were usually hollow, whereby the hollow cavities of the handles were in communication with the interiors of the main portions of the containers. A disadvantage of such handle construction resides in the fact that the contents of the main portion of the container can enter the hollow handle and, should the handle be torn off or develop an undesirable opening, such as a pinhole, the contents may escape through the handle.

SUMMARY OF THE INVENTION

The present invention relates to apparatus for forming a blow-moulded container having an integrally formed hollow handle hinged to the container by flexible hinge members to allow the handle to swivel through an arc of about 180°, and to be placed into a substantially parallel contacting relationship with the top wall of the container. Stacking is thereby facilitated and decreases the storage and shipping space requirement as compared with the containers having rigidly secured handles.

With the foregoing considerations in mind, it is a principal object of this invention to provide improved apparatus for forming the container body and a hollow blow-moulded handle conjointly in the blow-moulding operation.

DRAWING

Figure 1:
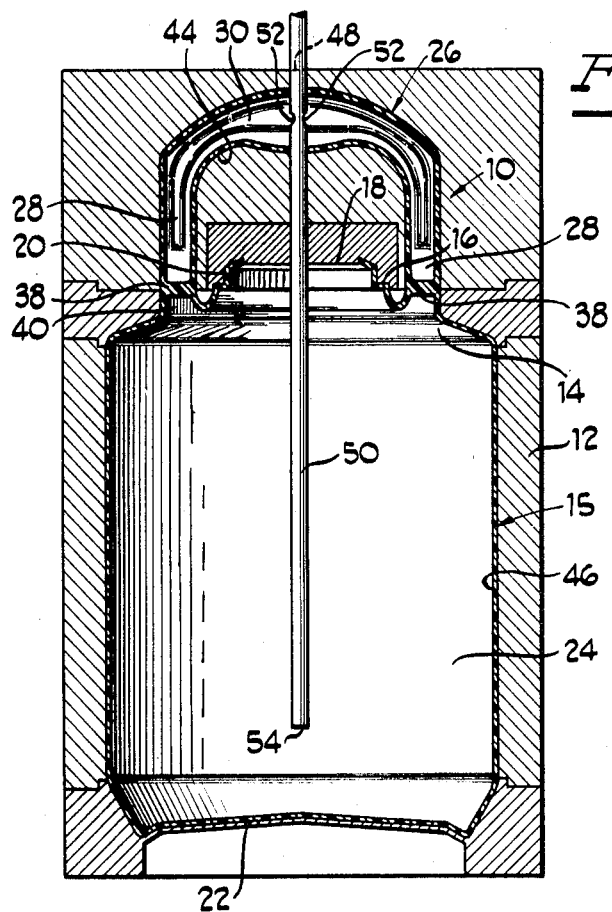
FIG. 1 is a sectional view showing a mould half with a container having an integrally formed hollow blow-moulded handle formed conjointly therewith, said container and handle being formed by the apparatus according to the present invention.
Figure 3:
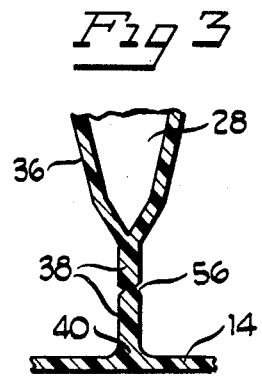
FIG. 3 is a sectional view taken generally along the line 3—3 of FIG. 2 looking in the direction of the arrows.
Figure 2:
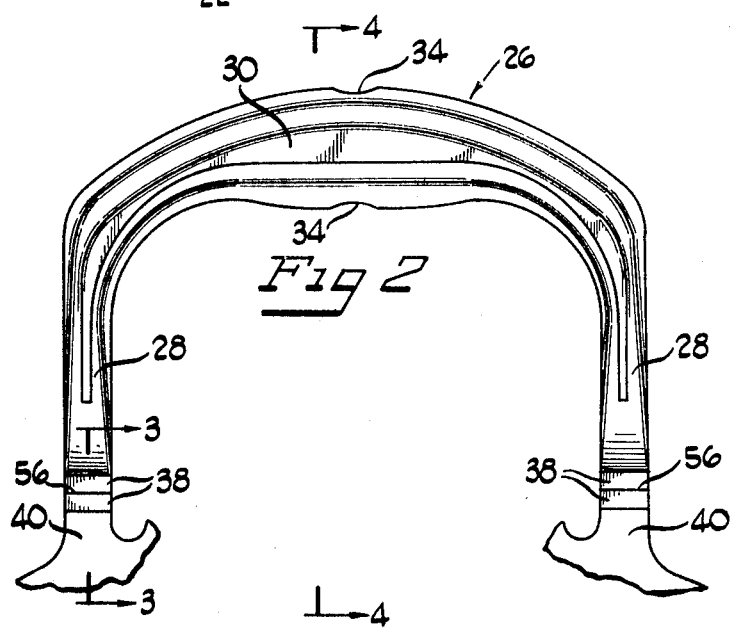
FIG. 2 is a detailed view of the handle of the container seen in FIG. 1.
Figure 4:
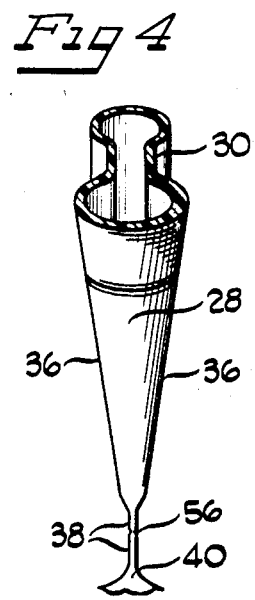
FIG. 4 is a sectional view taken generally along the line 4—4 of FIG. 2 looking in the direction of the arrows.

Referring now to FIG. 1, a container 10 is shown in section, and is positioned within a mould half 12. Two mould halves are used in the formation of the present container, the mould halves being movable relative to one another so as to come into mating closed relationship for the formation of container 10. A top wall 14 comprises a part of the body 15 of the container. Wall 14 has a centrally located annular shoulder 16 defining a circular opening 18 spaced from the shoulder 16 by an upstanding edge 20. Edge 20 may have a plurality of threads formed about its periphery for engaging similar threads within a closure cap adapted to be placed over opening 18.

Container 10 has a substantially circular bottom wall 22 interconnected with the top wall 14 by a cylindrical sidewall 24, all of the walls described theretofore being integrally formed.

A substantially U-shaped handle 26 is joined to the top wall 14 and formed integrally with the body 15 of container 10. Handle 26 has a pair of legs 28 interconnected at their tops by a gripping member 30 which may have any desirable cross section and is formed with a curved underside to be conveniently received in a person's hand for carrying.

A centrally located opening 34 extends through gripping member 30, the purpose of which will be described later. The legs 28 have downwardly tapered sides 36 which converge toward the top wall 14 by a flexible membrane 38 which forms a hinge member for the handle 26. A rise 40 upstands from the top wall 14 and extends upwardly to the membrane, or hinge member 38.

As stated heretofore, two mating mould halves, such as a pair of mould halves 12, are used in the formation of the body of the container and of the handle associated therewith. The mould half is a multicavity type mould having a cavity 44 for the formation of the handle 26 and a cavity 46 for the formation of the body 15 comprising the top wall 14, the bottom wall 22 and the sidewall 24. A groove 48 is provided in the upper portion of the mould half for receiving a blow tube 50 through which air, or other medium needed to expand the plastic in the formation of the container 10, is admitted into the mould when the mould halves are closed in registry for operation.

Hollow blow tube 50 is received through the openings 34 in the gripping member into the interior of the body of the container. The tube has a middle orifice 52 positioned within the gripping member 30, while the other, or lower, orifice 54 is located at the bottom end of the tube 50 and spaced a short distance from the interior surface of the bottom wall 22.

In the formation of the container of the present invention, a desired length of plastic tube, or parison, is received into the mould from an extruder (not shown) through a diehead (not shown). The upper portion of blow tube 50 is secured in the diehead and connected to a source of compressed air, or the like. Upon closing of the mould halves 12, the plastic tube is pinched while the air is being admitted through the blow tube 50 into the mould cavity. The middle orifice 52 in the blow tube is used to supply air to the handle-forming cavity 44, while the lower orifice 54 supplies the air necessary to expand the plastic tube within the mould cavity 46 to form the body 15 of the container.

At completion of the blow moulding operation, the membranes 38 are subjected to forging, coining, or the like, to reduce their cross-sectional thickness. The average cross-sectional thickness of a moulded membrane is approximately 0.032 inch. The subsequent forging or coining reduces the thickness to an average of 0.012 inch. As a result of the above operation, the membrane or hinge member becomes tough and flexible, permitting bending and swiveling of the handle 26 about a horizontal axis 56 formed on each of the hinge members.

Forging or coining or the like of the hinge members 38 produces molecular orientation of the hinge members which is 90° opposite to the horizontal axis 56 about which the handle 26 is bendable. Such molecular orientation produces a good, durable hinge.

I claim:

1. In apparatus for forming a moulded container having a body portion including top and bottom walls and a connecting sidewall and a hollow handle integrally formed with said body portion with a connecting solid web between said body and said hollow handle;

a. a mould having:
      i. a body cavity wherein said body portion is formed;
      ii. a handle cavity wherein said hollow handle is formed;
      iii. a web cavity wherein said web is formed;
   b. said mould being adapted to receive a parison for blowing thereof while within said mould cavities;
   c. a single blow tube extending into said mould and passing through said handle cavity and terminating in said body cavity;
   d. said blow tube being connected to a source of pressure fluid to blow said parison;
   e. first means in said blow tube in register with said handle cavity to blow that portion of said parison within said handle cavity to form a hollow handle;
   f. second means in said blow tube in register with said body cavity to blow that portion of said parison within said body cavity into said body portion.